United States Patent
Chou et al.

(10) Patent No.: US 9,677,954 B2
(45) Date of Patent: Jun. 13, 2017

(54) INSTANT RESPONSE PRESSURE SENSOR

(71) Applicant: UNEO INC., Tapei (TW)

(72) Inventors: Chia-Hung Chou, Taipei (TW);
Chih-Sheng Hou, Taipei (TW)

(73) Assignee: UNEO INC., Taipei (TW)

( * ) Notice: Subject to any disclaimer, the term of this patent is extended or adjusted under 35 U.S.C. 154(b) by 201 days.

(21) Appl. No.: 14/466,667

(22) Filed: Aug. 22, 2014

(65) Prior Publication Data
US 2016/0054184 A1    Feb. 25, 2016

(51) Int. Cl.
*G01L 1/22*    (2006.01)
*G01L 1/18*    (2006.01)
*G06F 3/0354*    (2013.01)
*G01L 5/00*    (2006.01)
*H01C 10/12*    (2006.01)

(52) U.S. Cl.
CPC .............. *G01L 1/18* (2013.01); *G01L 5/0019* (2013.01); *G06F 3/03545* (2013.01); *H01C 10/12* (2013.01)

(58) Field of Classification Search
CPC . G01L 1/16; G01L 1/18; G01L 5/0019; G01L 5/22; H01C 10/10; H01C 10/12; H01C 10/16
USPC ...... 73/721, 725, 727, 763, 744; 338/13, 47, 338/99
See application file for complete search history.

(56) References Cited

U.S. PATENT DOCUMENTS

| | | | | |
|---|---|---|---|---|
| 5,948,990 A * | 9/1999 | Hashida | ............... | G01L 1/20 338/114 |
| 6,109,117 A * | 8/2000 | Stanley | ............... | B60N 2/002 73/862.325 |
| 6,121,869 A * | 9/2000 | Burgess | ............... | H01H 3/141 200/511 |
| 2005/0248549 A1* | 11/2005 | Dietz | ............... | G06F 3/016 345/179 |
| 2011/0048139 A1* | 3/2011 | Chen | ............... | G01L 9/0052 73/727 |
| 2011/0073505 A1* | 3/2011 | Stiehl | ............... | G06F 1/1656 206/320 |
| 2013/0134992 A1* | 5/2013 | Zhu | ............... | G01M 3/18 324/658 |

* cited by examiner

*Primary Examiner* — Benjamin Schmitt
(74) *Attorney, Agent, or Firm* — Hauptman Ham, LLP

(57) ABSTRACT

An instant response pressure sensor is disclosed. An embodiment shows no continuous gap is configured between a piezoresistor and neighboring element(s) in thickness direction. The instant response pressure sensor is able to respond immediately to an extremely small pressure applied thereupon in the early stage with an extremely small distance movement because the instant response pressure sensor without having an extra press journey to move before trigging.

14 Claims, 17 Drawing Sheets

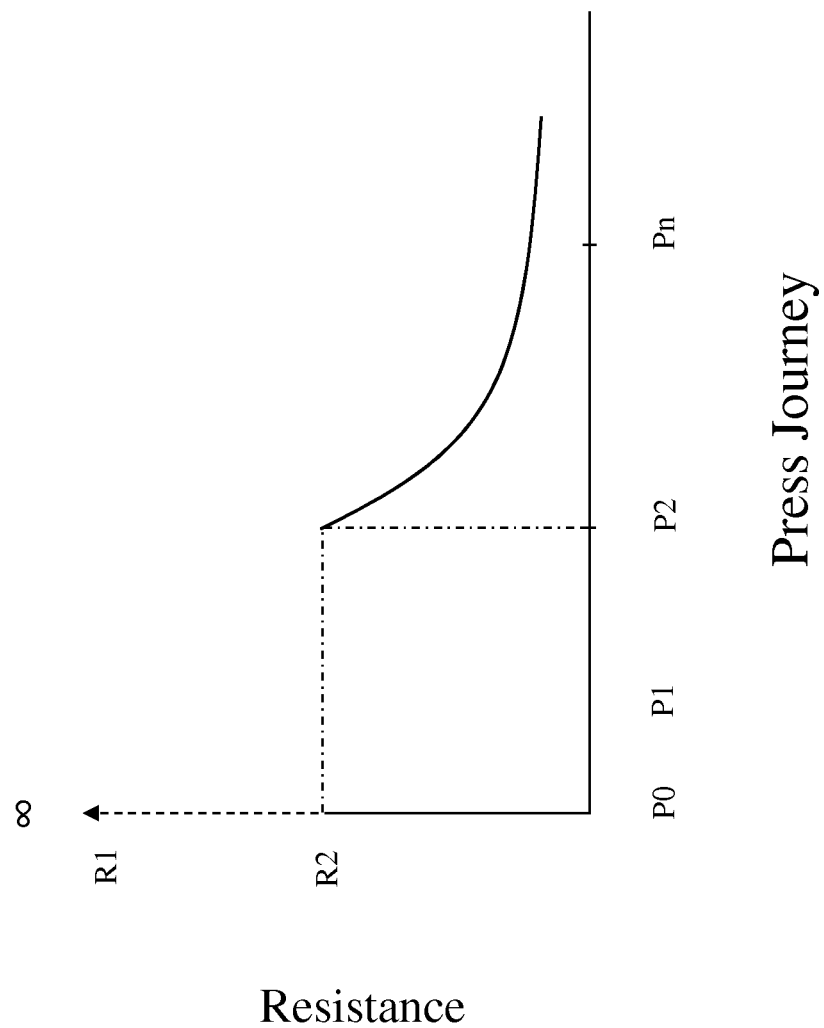

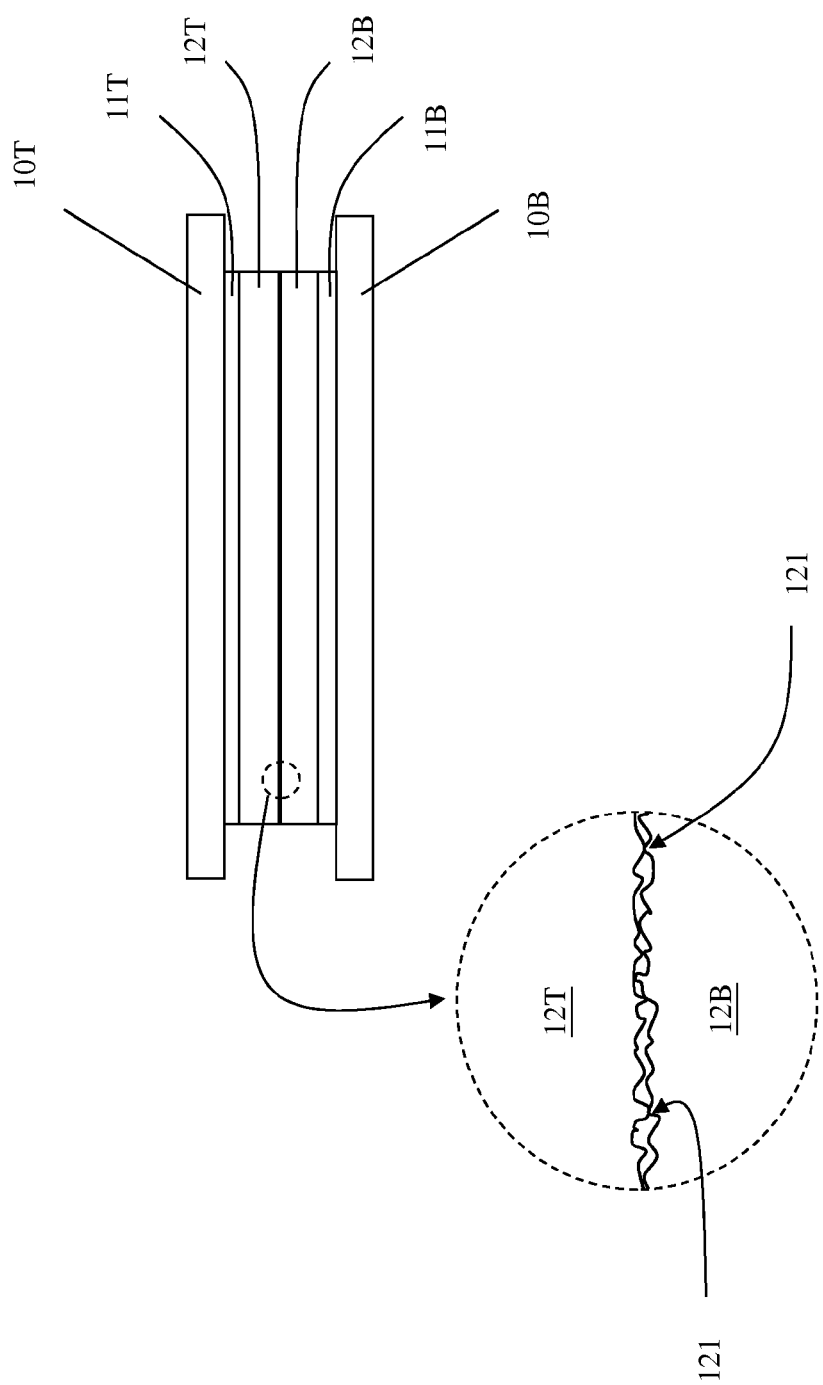

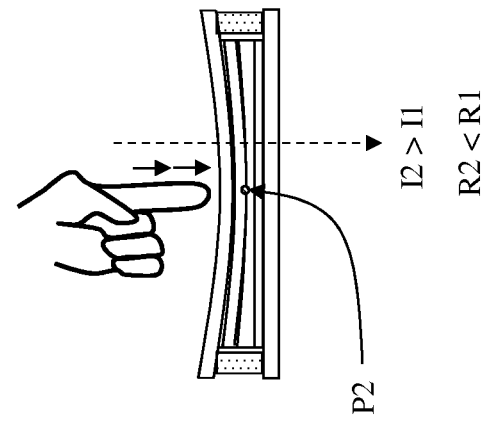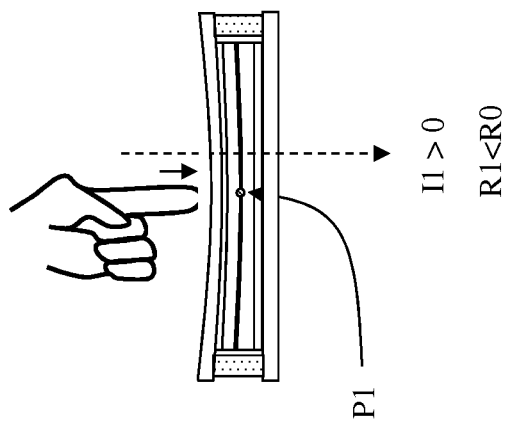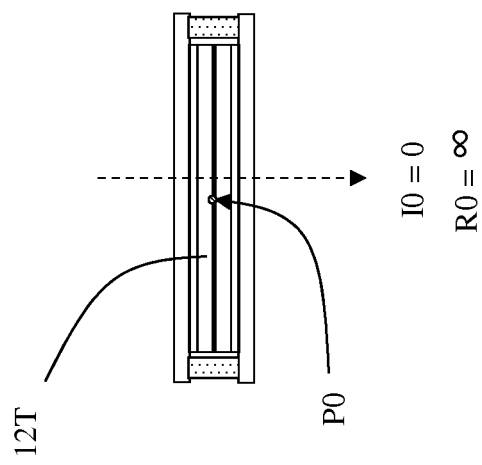

INSTANT RESPONSE PRESSURE SENSOR

BACKGROUND

Technical Field

The present invention relates to a pressure sensor, especially an instant response pressure sensor which does not have any extra press journey before triggering a signal corresponding to an extremely small pressure applied against it due to the fact that the disclosed structure does without having a continuous gap between a piezoresistor and a neighboring element in the thickness direction.

Description of Related Art

FIG. 1 shows a prior art pressure sensor which has a top substrate 10T. A top electrode 11T is configured on a bottom side of the top substrate 10T; a top piezoresistor 12T is configured on a bottom side of the top electrode 11T. A bottom piezoresistor 12B is configured under the top piezoresistor 12T while keeping a continuous space or gap 16 therebetween; and a bottom electrode 11B is configured on a bottom side of the bottom piezoresistor 12B. A bottom substrate 10B is configured on a bottom side of the bottom electrode 11B.

FIG. 2 shows an operation of the prior art

FIG. 2A shows that the pressure sensor displays a current I0 which is zero ampere (I0=0), and a resistance R0 which is infinity (R0=∞) before the pressure sensor is depressed. At this moment, the bottom surface of the top piezoresistor 12T is shown at a position P0.

FIG. 2B shows that the pressure sensor displays a current I1 which is zero ampere (I1=0) and a resistance R1 which is infinity (R1=∞) when it is depressed initially to a status just offset the continuous gap 16 between the two piezoresistors 12T, 12B. In other words, the pressure sensor is depressed at a position where the top piezoresistor 12T just touches the bottom piezoresistor 12B. At this moment, the bottom surface of the top piezoresistor 12T is shown at a position P1.

FIG. 2C shows that the pressure sensor displays a current I2 which is larger than zero ampere (I2>0) and a measurable resistance R2 displayed when it is depressed further more. In other words, the pressure sensor is depressed further more than the position it was as shown in FIG. 2B. At this moment, the bottom surface of the top piezoresistor 12T is at a position P2.

FIG. 3 shows Resistance v. Press Journey for the prior art

FIG. 3 shows that the Y-axis shows Resistance, and the X-axis shows Press Journey. Either the resistance R0 or R1 of the prior art device is infinity when the bottom surface of the top piezoresistor 12T is at a position of either P0 or P1. The resistance of the prior art device is R2 when the bottom surface of the top piezoresistor 12T is at a position of P2 which is a trigger position.

BRIEF DESCRIPTION OF THE DRAWINGS

FIG. 3 shows Resistance v. Press Journey for the prior art

FIGS. 4A~4B show a first embodiment according to the present invention

FIGS. 5A~5C show an operation of the first embodiment

DETAILED DESCRIPTION OF THE INVENTION

The present invention discloses an instant response pressure sensor which senses extremely small pressures applied against the sensor. The feature of early response makes it suitable for being used as an immediate sensor such as a pressure sensitive electronic pen, or a pressure sensitive volume button for an electronic apparatus . . . etc.

FIGS. 4A~4B show a first embodiment according to the present invention.

FIG. 4A shows a first embodiment of an instant response pressure sensor which has a top substrate 10T, a top electrode 11T configured on a bottom side of the top substrate 10T, a top piezoresistor 12T configured on a bottom side of the top electrode 11T, a bottom piezoresistor 12B configured under the top piezoresistor 12T, a bottom electrode 11B configured on a bottom side of the bottom piezoresistor 12B, and a bottom substrate 10B configured on a bottom side of the bottom electrode 11B. A top surface of the bottom piezoresistor 12B is configured to contact a bottom surface of the top piezoresistor 12T with an infinite resistance therebetween before a pressure is applied against the pressure sensor.

FIG. 4B shows an interface between the top piezoresistor and the bottom piezoresistor. A bottom surface of the top piezoresistor 12T is rugged in a microscopic view, and a top surface of the bottom piezoresistor 12B is also rugged in a microscopic view, therefore partial area contacts 121 exist therebetween and an infinite resistance is displayed therebetween due to extremely small area contact.

FIGS. 5A~5C show an operation of the first embodiment

FIG. 5A shows that the pressure sensor displays a current I0 which is zero ampere (I0=0) and a resistance R0 which is infinity (R0=∞) before it is depressed. At this moment, the bottom surface of the top piezoresistor 12T is shown at a position P0.

FIG. 5B shows that the pressure sensor displays a current I1 which is larger than zero ampere (I1>0), a measurable resistance R1 is displayed which is smaller than R0 (R1<R0) when the pressure sensor is depressed initially. In other words, the pressure sensor is lightly depressed and at this moment, the bottom surface of the top piezoresistor 12T is shown at a position P1.

FIG. 5C shows that the pressure sensor displays a current I2 larger than the current I1 (I2>I1), a measurable resistance R2 is displayed which is smaller than R1 (R2<R1) when it is depressed further more. In other words, the pressure sensor is depressed heavier than the position it was as shown in FIG. 5B. At this moment, the bottom surface of the top piezoresistor 12T is at a position P2.

Figure 1:
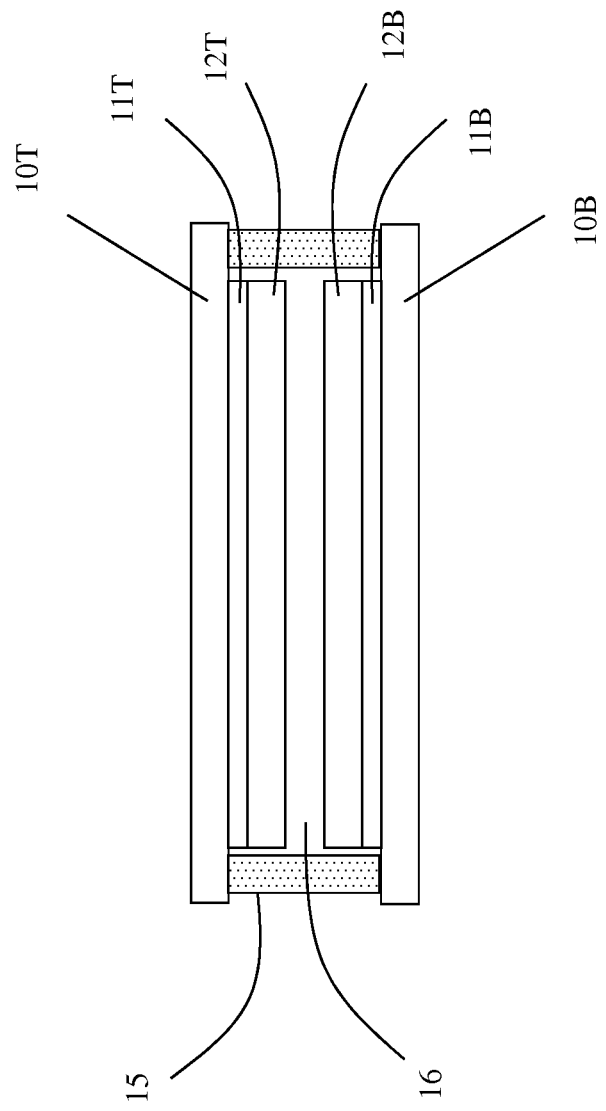
FIG. 1 shows a prior art
Figure 2:
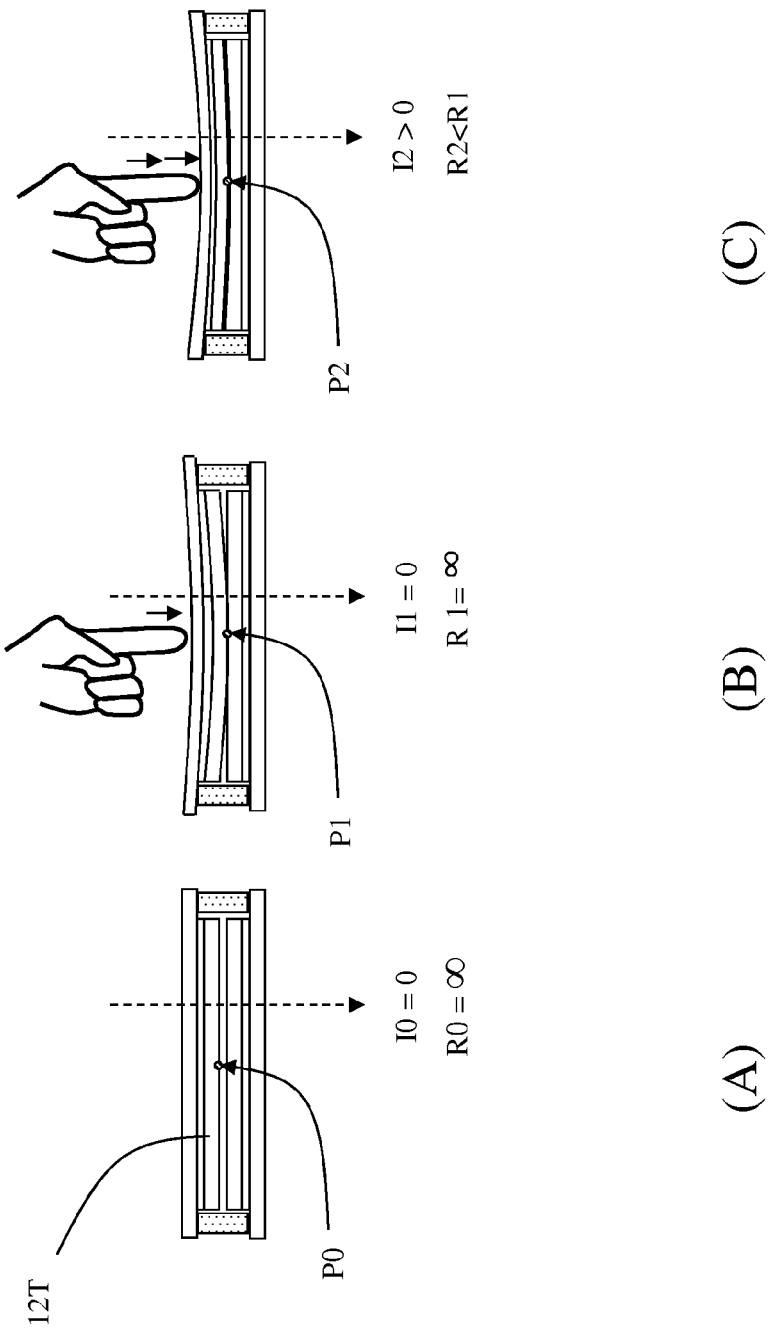
FIG. 2 shows an operation of the prior art
Figure 6:
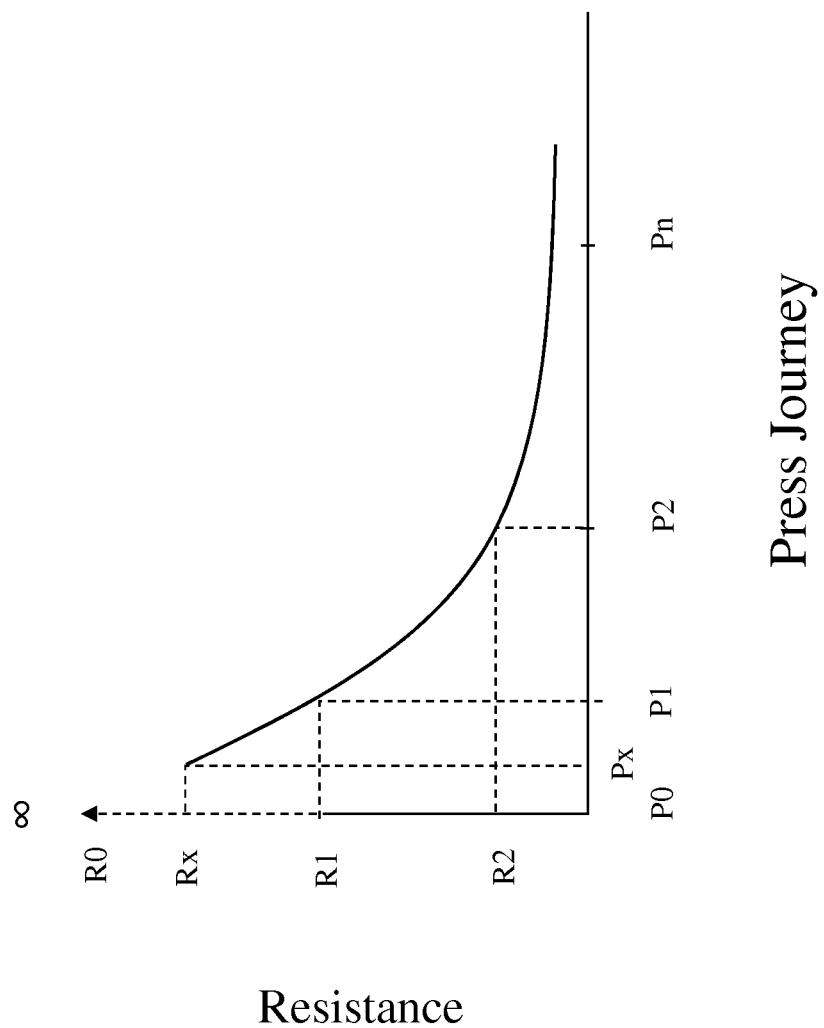
FIG. 6 shows Resistance v. Press Journey for the first embodiment

FIG. 6 shows Resistance v. Press Journey for the first embodiment

FIG. 6 shows that the resistance R0 of the first embodiment is infinity when the bottom surface of the top piezoresistor 12T is at a position P0. The resistance R1 is displayed for the first embodiment when the bottom surface of the top piezoresistor 12T is depressed at a position P1. Referring to FIG. 6 a trigger position Px for the first embodiment can be found in between position P0 and P1, namely P0<Px<P1, and a corresponding resistance Rx can be detected for the trigger position Px, where ∞>Rx>R1.

Figure 7:
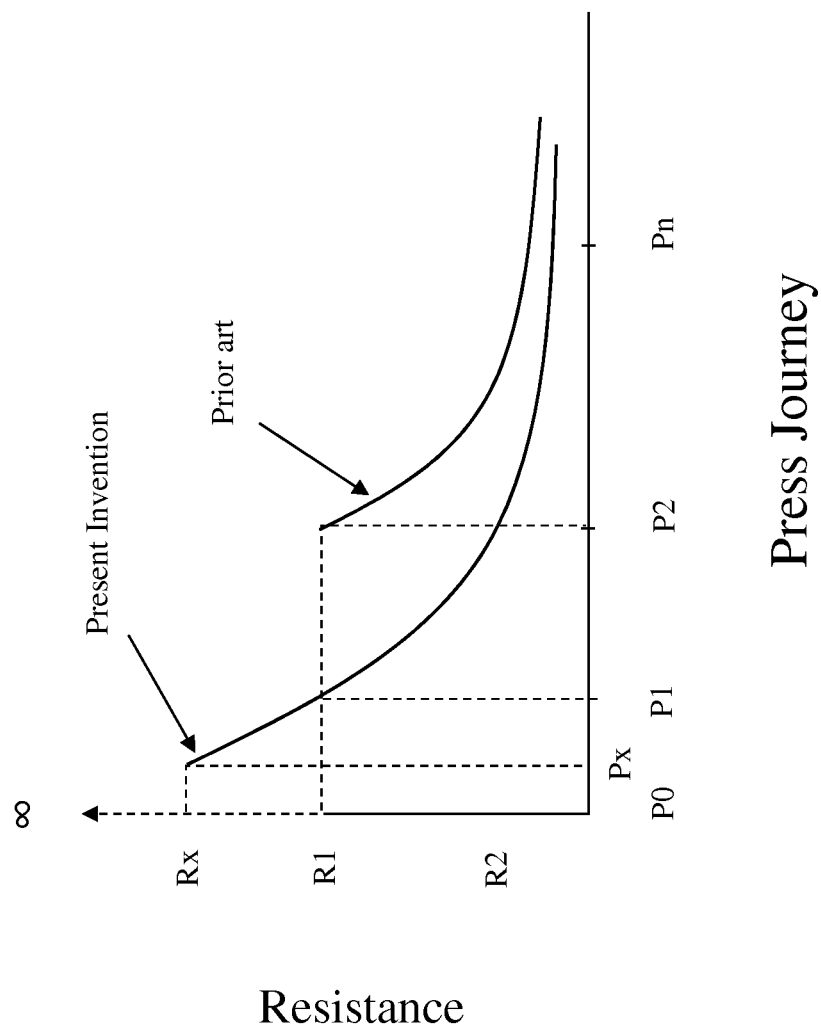
FIG. 7 shows a comparison of the electric characteristics between the present invention and the prior art

FIG. 7 shows a comparison of the electric characteristics between the present invention and the prior art. A left lower curve shows the electric characteristics for the present invention. A right upper curve shows the electric characteristics for the prior art. Under similar operation, the present invention has a trigger position at Px and the prior art has a trigger position at P2; where P2>Px. That means the present invention can trigger very earlier than a prior art. Correctly to say, the present invention triggers at the very beginning when a pressure applied against the pressure sensor, even an extremely small pressure is applied. Meanwhile, the press journey is extremely small before trigging.

Figure 8:
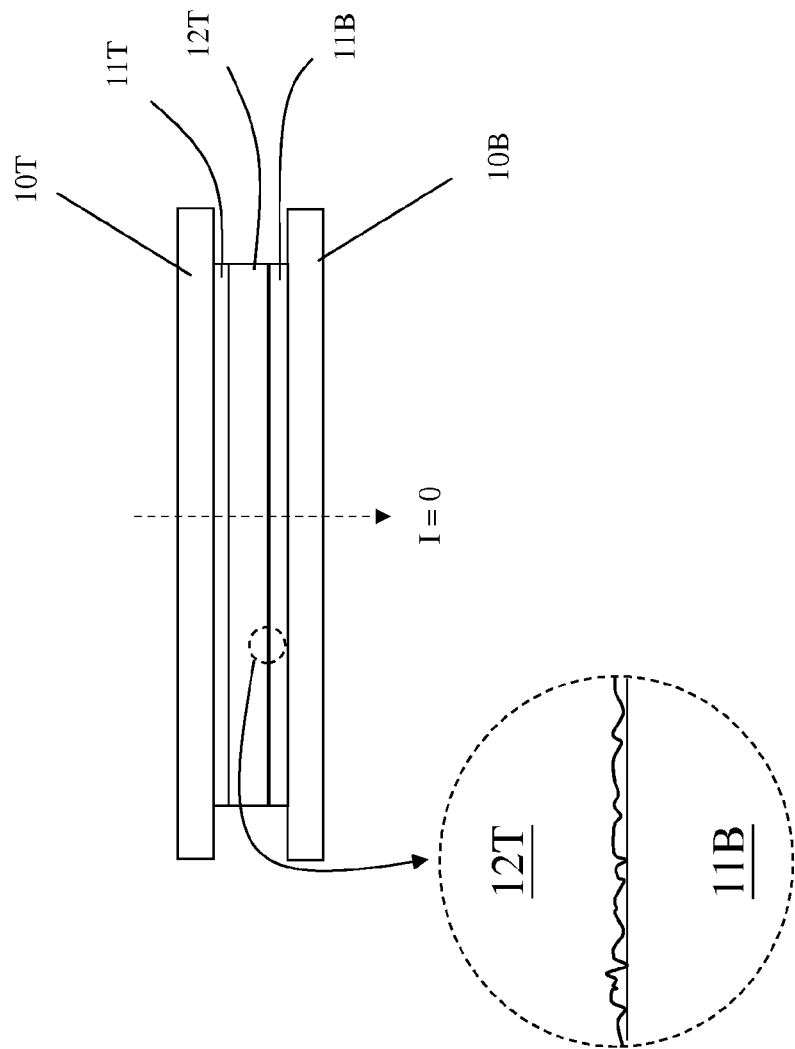
FIGS. 8A~8B show a second embodiment according to the present invention

FIGS. 8A~8B show a second embodiment according to the present invention

FIG. 8A shows that an instant response pressure sensor has a top electrode 11T; a piezoresistor 12T is configured on a bottom side of the top electrode 11T; a bottom electrode 11B is configured under the piezoresistor 12T; wherein the piezoresistor 12T contacts the bottom electrode 11B with an infinite resistance before a pressure applied against the pressure sensor, where I=0. A top substrate 10T is configured on a top side of the top electrode 11T, and a bottom substrate 10B is configured on a bottom side of the bottom electrode 11B.

FIG. 8B shows an interface between the piezoresistor and the bottom electrode

Since a bottom surface of the piezoresistor 12T is rugged in a microscopic view so that partial area contacts exist to maintain an infinite resistance between the piezoresistor and the bottom electrode.

Figure 9:
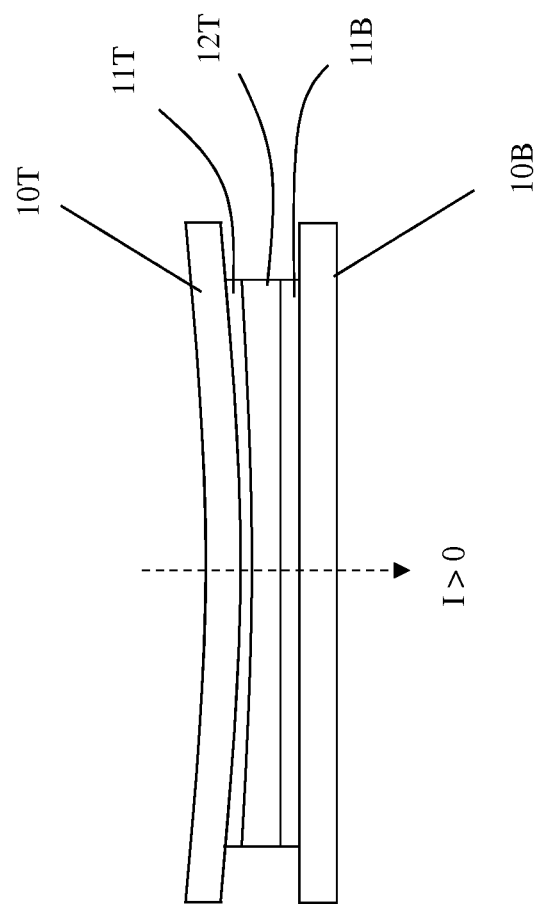
FIG. 9 shows an operation of the second embodiment

FIG. 9 shows an operation of the second embodiment

FIG. 9 shows that a current I passes through the top electrode 11T, the piezoresistor 12T and the bottom electrode 11B when a pressure is applied against the pressure sensor, where I>0.

Figure 10:
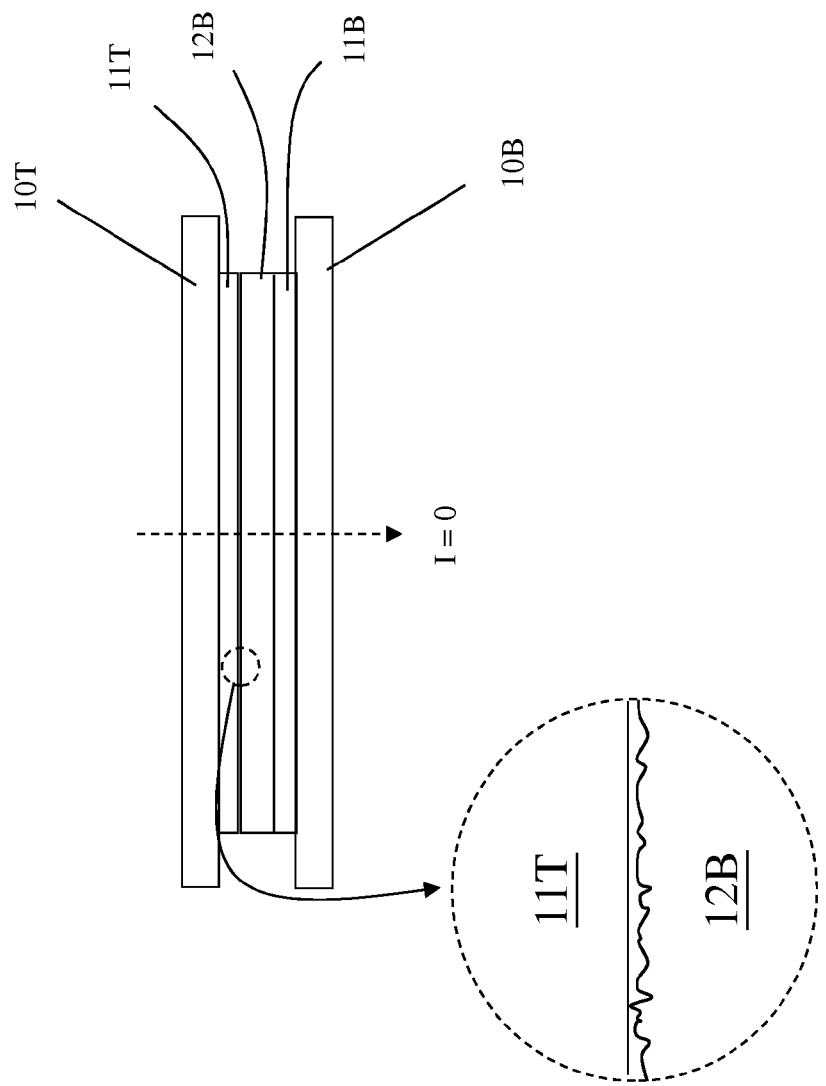
FIGS. 10A~10B show a third embodiment according to the present invention

FIGS. 10A~10B show a third embodiment according to the present invention

FIG. 10A shows that an instant response pressure sensor has a top electrode 11T; a piezoresistor 12B is configured under a bottom side of the top electrode 11T; wherein the top electrode 11T contacts the piezoresistor 12B with an infinite resistance before a pressure applied against the pressure sensor, where I=0; a bottom electrode 11B is configured on a bottom surface of the piezoresistor 12B. A top substrate 10T is configured on a top side of the top electrode 11T; and a bottom substrate 10B is configured on a bottom side of the bottom electrode 11B.

FIG. 10B shows an interface between the top electrode and the piezoresistor

Since a top surface of the piezoresistor 12B is rugged in a microscopic view so that partial area contacts exist to maintain an infinite resistance between the top electrode 11T and the piezoresistor 12B.

Figure 11:
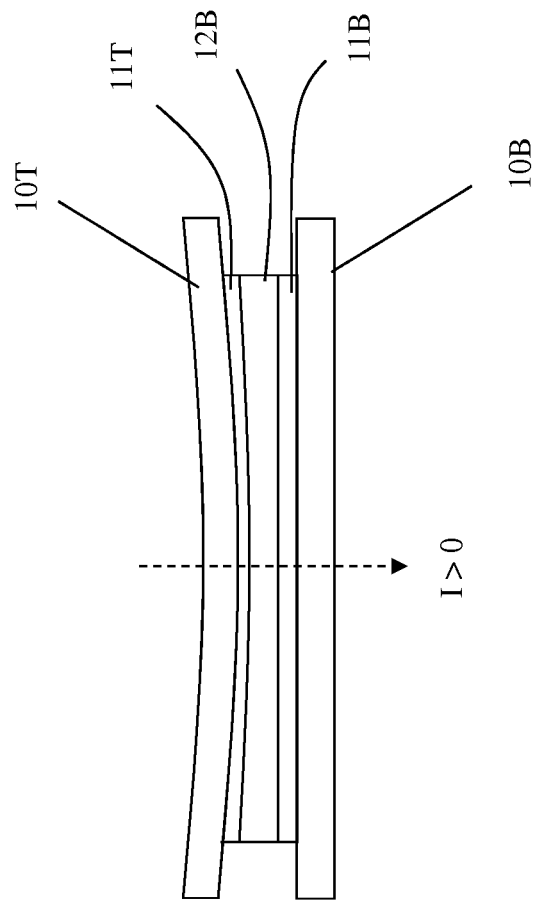
FIG. 11 shows an operation of the third embodiment

FIG. 11 shows an operation of the third embodiment

FIG. 11 shows that a current I passes through the top electrode 11T, the piezoresistor 12B and the bottom electrode 11B when a pressure is applied against the pressure sensor, where I>0.

Figure 12:
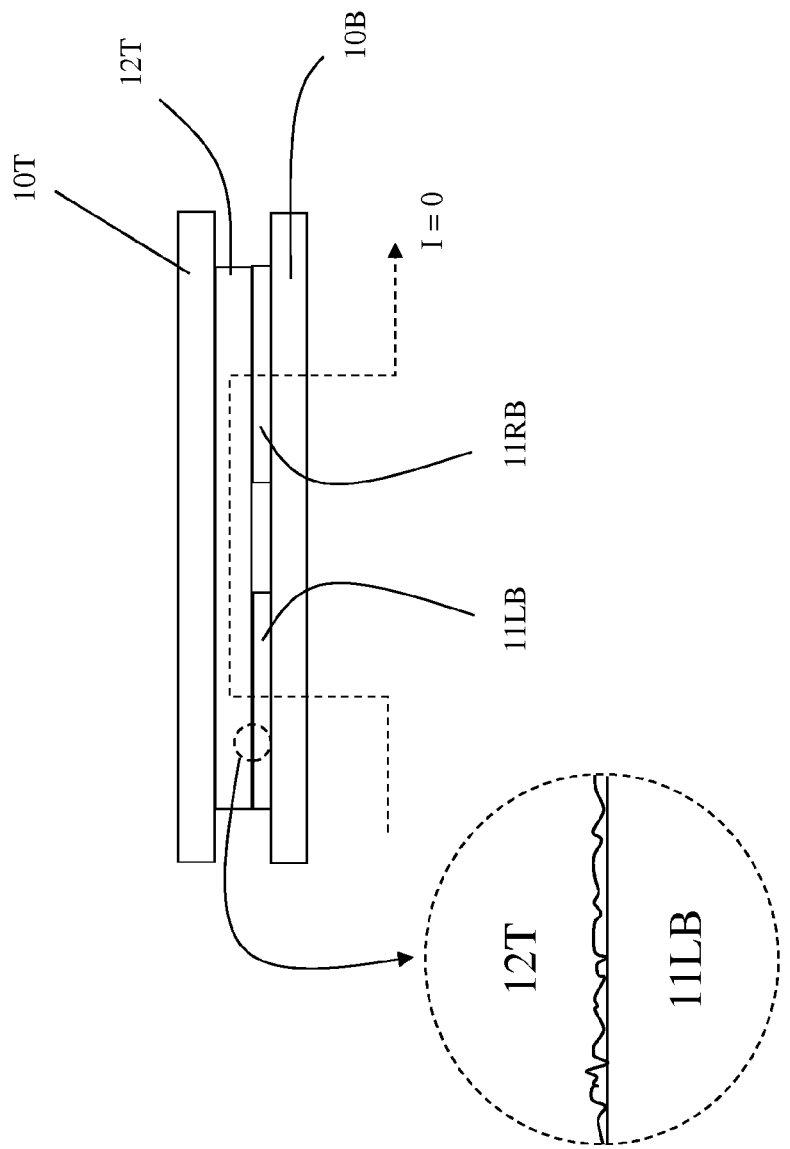
FIGS. 12A~12B show a fourth embodiment according to the present invention

FIGS. 12A~12B show a fourth embodiment according to the present invention

FIG. 12A shows that an instant response pressure sensor has a piezoresistor 12T; a first electrode 11LB, and a second electrode 11RB coplanar with the first electrode 11LB, are configured under a bottom side of the piezoresistor 12T; wherein the piezoresistor 12T contacts the top surface of the two electrodes 11LB, 11RB with an infinite resistance therebetween before a pressure applied against the pressure sensor, where I=0; a top substrate 10T is configured on a top side of the piezoresistor 12T; and a bottom substrate 10B is configured on a bottom side of the two electrodes 11LB, 11RB.

FIG. 12B shows an interface between the piezoresistor and the two electrodes

Since a bottom surface of the piezoresistor 12T is rugged in a microscopic view so that partial area contacts exist to maintain an infinite resistance between it and the two bottom electrodes 11LB, 11RB.

Figure 13:
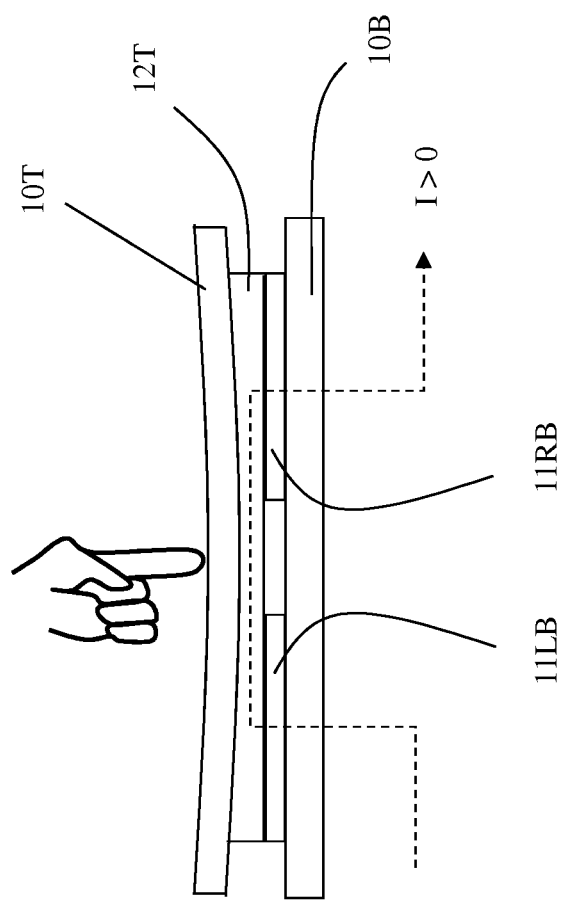
FIG. 13 shows an operation of the fourth embodiment

FIG. 13 shows an operation of the fourth embodiment

FIG. 13 shows that a current I passes through the left electrode 11LB, the piezoresistor 12T and the right electrode 11RB when a pressure is applied against the pressure sensor, where I>0.

Figure 14:
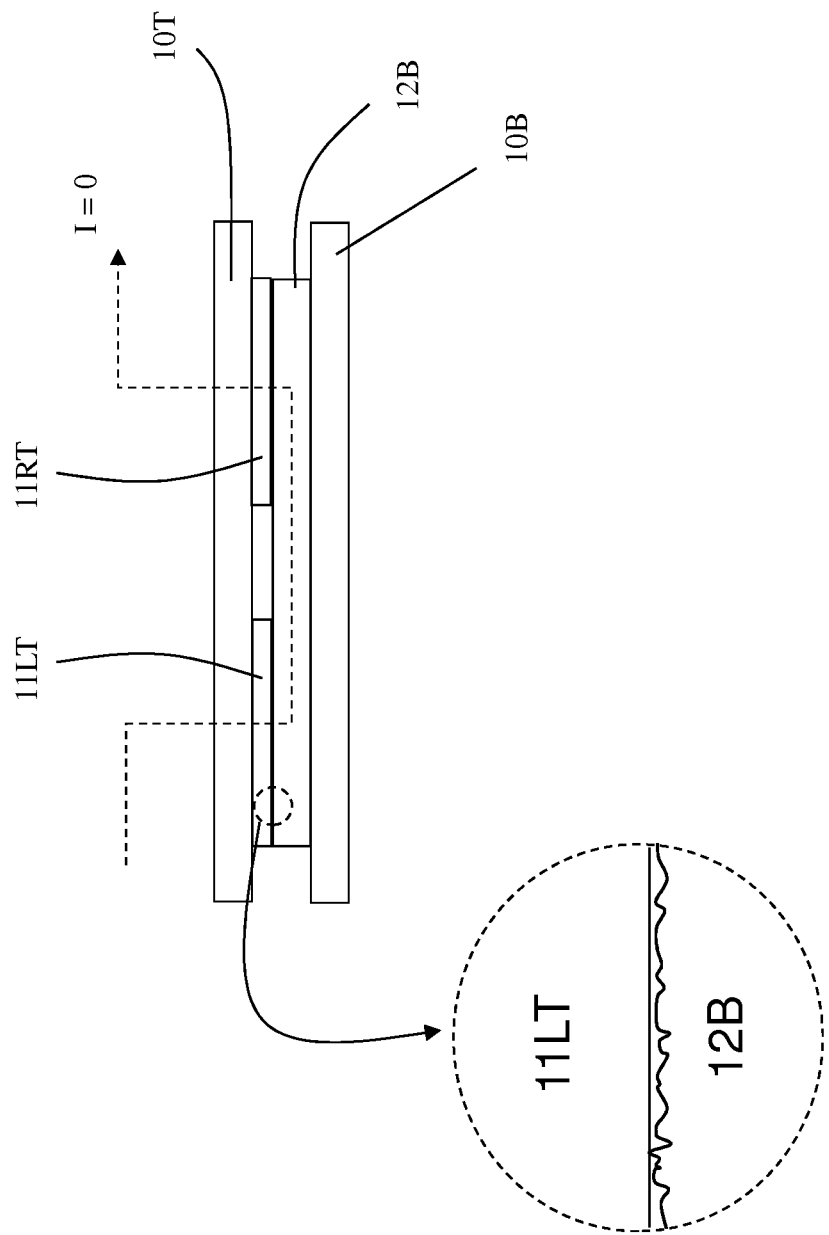
FIGS. 14A~14B show a fifth embodiment according to the present invention

FIGS. 14A~14B show a fifth embodiment according to the present invention

FIG. 14A shows that an instant response pressure sensor has a first electrode 11LT, and a second electrode 11RT coplanar with the first electrode 11LT; a piezoresistor 12B is configured under a bottom side of the two electrodes 11LT, 11RT; wherein the electrodes contact the top surface of the piezoresistor 12B with an infinite resistance therebetween before a pressure applied against the pressure sensor, where I=0. A top substrate 10T is configured on a top side of the two electrodes 11LT, 11RT; and a bottom substrate 10B is configured on a bottom side of the piezoresistor 12B.

FIG. 14B shows an interface between the two electrodes and the piezoresistor

Since a top surface of the piezoresistor 12B is rugged in a microscopic view so that partial area contacts exist to maintain an infinite resistance between the piezoresistor 12B and the two electrodes 11LT, 11RT.

Figure 15:
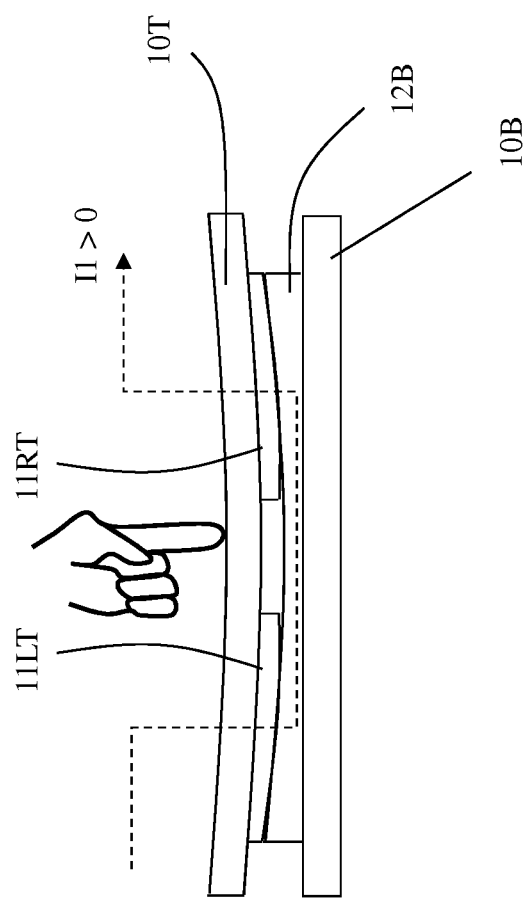
FIG. 15 shows an operation of the fifth embodiment

FIG. 15 shows an operation of the fifth embodiment

FIG. 15 shows that a current I passes through the left electrode 11LT, the piezoresistor 12B and the right electrode 11RT when a pressure is applied against the pressure sensor, where I>0.

Figure 16:
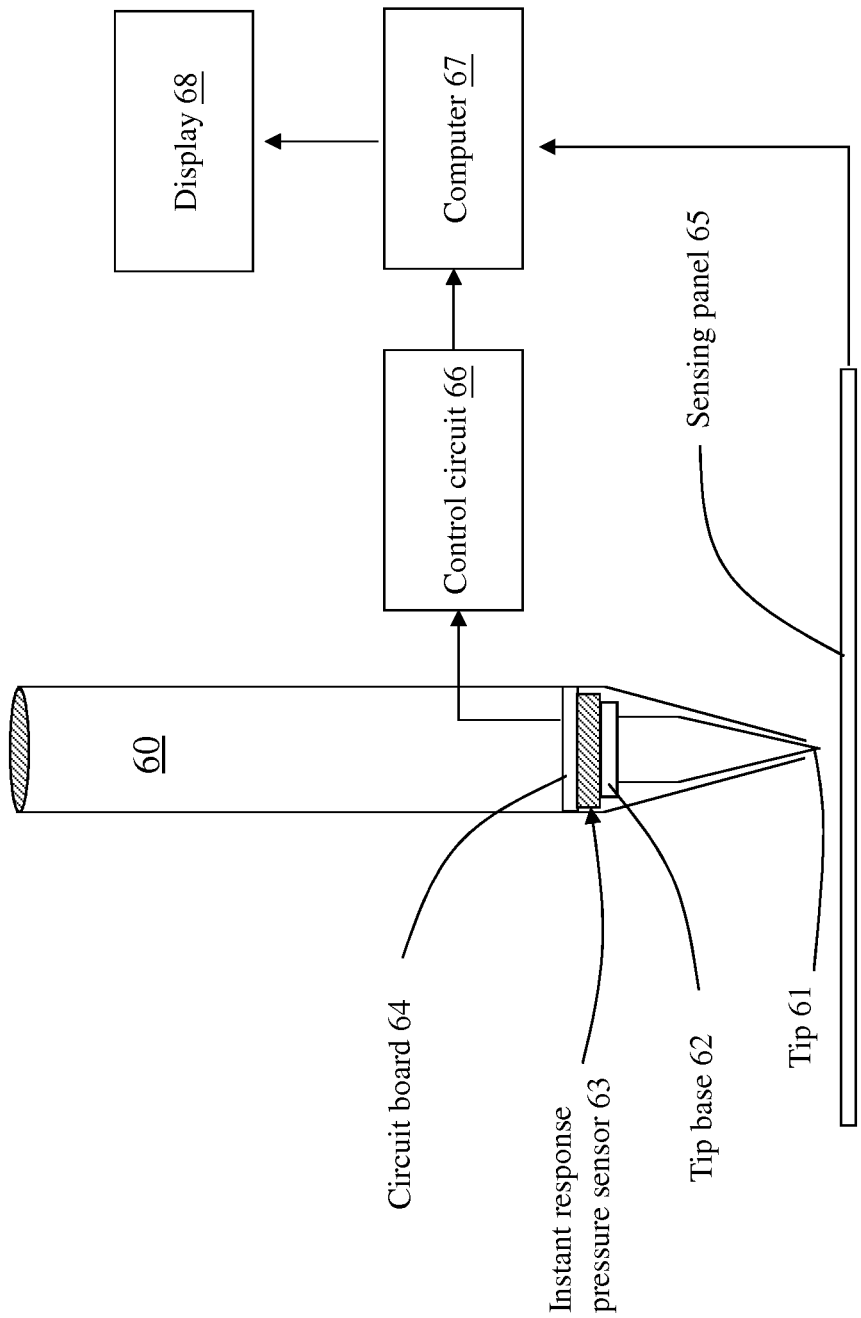
FIG. 16 shows a first application of the pressure sensor according to the present invention

FIG. 16 shows a first application of the pressure sensor according to the present invention An electronic pen 60 has an instant response pressure sensor 61 of the present invention configured on a backside of a tip base 62. The tip base 62 is configured on a back side of a pen tip 61. The instant response pressure sensor 61 is configured for sensing a pressure applied against the pen tip 61; an electrical signal is generated corresponding to the pressure applied for a further processing. A circuit board 64 is configured on a backside of the instant response pressure sensor 63, for processing the signal received from the instant response pressure sensor 63. The circuit board 64 electrically couples to a control circuit 66, the control circuit 66 electrically couples to a computer 67 which in turn electrically couples to a display 68. A sensing panel 65 is configured for sensing the pressure applied from the pen tip 61. The sensing panel 65 electrically couples to the computer 67, so that the display 68 can display an image delineated by the pen 60.

Figure 17:
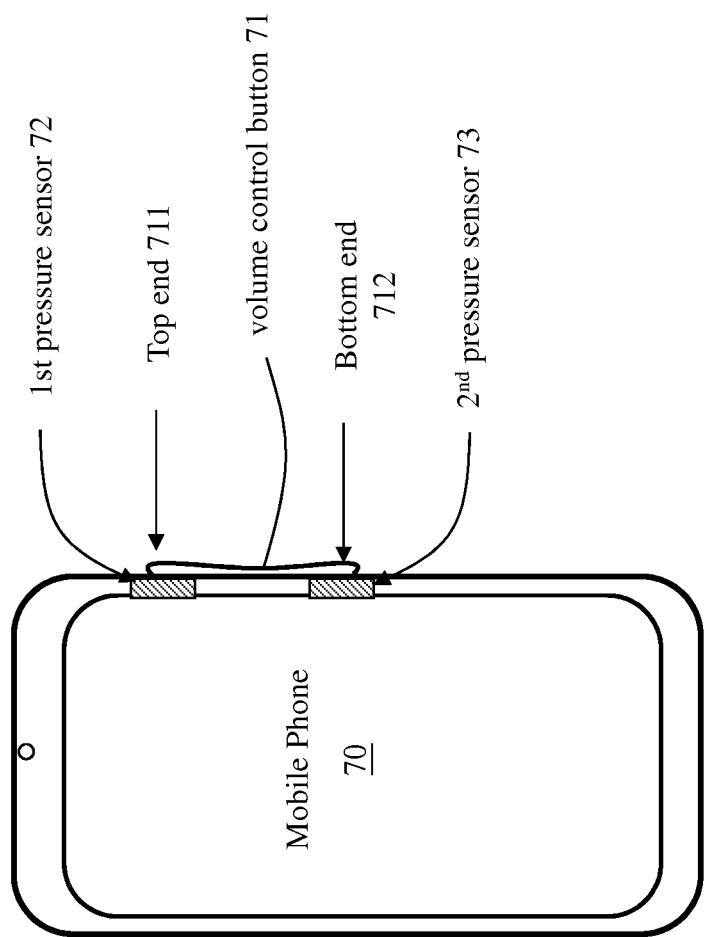
FIG. 17 shows a second application of the pressure sensor according to the present invention

FIG. 17 shows a second application of the pressure sensor according to the present invention FIG. 17 shows that a mobile phone 70 has a volume control button 71; the volume control button 71 has top end 711 depressible to increase the volume, and has a bottom end 712 depressible to decrease the volume. A first instant response pressure sensor 72 is configured on a bottom side of a top end 711 of the button 71 for sensing pressures applied against the top end 711 of the button 71. A second instant response pressure sensor 73 is configured on a bottom side of the bottom end 712 of the button 71 for sensing pressures applied against the bottom end 712 of the button 71. A first electrical signal is generated corresponding to the pressure applied against the top end 711 of the button 71 for a further processing, and a second electrical signal is generated corresponding to the pressure applied against the bottom end 712 of the button for a further processing.

While several embodiments have been described by way of example, it will be apparent to those skilled in the art that various modifications may be configured without departs from the spirit of the present invention. Such modifications are all within the scope of the present invention, as defined by the appended claims.

What is claimed is:

1. An instant response pressure sensor, comprising:
a first structure comprising a first electrode and a piezoresistor; and
a second structure comprising a second electrode;
wherein the piezoresistor directly contacts the second structure with an infinite resistance between the piezoresistor and the second structure before a pressure is applied against the pressure sensor, and
wherein the piezoresistor has a rugged surface in a microscopic view so that direct partial area contacts exist between the surface of the piezoresistor and a surface of the second electrode to maintain an infinite resistance between the piezoresistor and the second electrode before a pressure is applied against the pressure sensor.

2. The instant response pressure sensor as claimed in claim 1, wherein
the second electrode is a top electrode;
the piezoresistor is configured under a bottom side of the top electrode;
the top electrode directly contacts the piezoresistor with an infinite resistance between the piezoresistor and the top electrode before a pressure is applied against the pressure sensor; and
the first electrode is a bottom electrode configured on a bottom surface of the piezoresistor.

3. The instant response pressure sensor as claimed in claim 1, wherein
the second electrode is coplanar with the first electrode;
the first and second electrodes are configured under a bottom side of the piezoresistor; and
the piezoresistor directly contacts top surfaces of the first and second electrodes with an infinite resistance between (i) the piezoresistor and (ii) each of the first and second electrodes before a pressure is applied against the pressure sensor.

4. The instant response pressure sensor as claimed in claim 3, wherein
a bottom surface of the piezoresistor is a rugged surface in a microscopic view so that direct partial area contacts exist between (i) the bottom surface of the piezoresistor and (ii) the top surface of each of the first and second electrodes to maintain the infinite resistance between the piezoresistor and each of the first and second electrodes before a pressure is applied against the pressure sensor.

5. The instant response pressure sensor as claimed in claim 1, wherein
the second electrode is coplanar with the first electrode;
the piezoresistor is configured under a bottom side of the first and second electrodes; and
the first and second electrodes directly contact a top surface of the piezoresistor with an infinite resistance between (i) the piezoresistor and (ii) each of the first and second electrodes before a pressure is applied against the pressure sensor.

6. The instant response pressure sensor as claimed in claim 5, wherein
the top surface of the piezoresistor is a rugged surface in a microscopic view so that direct partial area contacts exist between (i) the top surface of the piezoresistor and (ii) a bottom surface of each of the first and second electrodes to maintain the infinite resistance between the piezoresistor and each of the first and second electrodes before a pressure is applied against the pressure sensor.

7. An electronic pen, comprising:
an instant response pressure sensor as claimed in claim 1, the pressure sensor configured on a backside of a tip base for sensing a pressure applied against a tip of the electronic pen; and
a circuit configured to process an electrical signal generated by the pressure sensor corresponding to the pressure applied against the tip.

8. A mobile phone, comprising:
a first instant response pressure sensor as claimed in claim 1, the first pressure sensor configured under a top end of a volume control button of the mobile phone;
a second instant response pressure sensor as claimed in claim 1, the second pressure sensor configured under a bottom end of the volume control button; and
a circuit configured to process
a first electrical signal generated by the first pressure sensor corresponding to a pressure applied against the top end of the volume control button; and
a second electrical signal generated by the second pressure sensor corresponding to the pressure applied against the bottom end of the volume control button.

9. The instant response pressure sensor as claimed in claim 1, wherein, in said microscopic view, the surface of the piezoresistor has a higher roughness than the surface of the second electrode.

10. An instant response pressure sensor, comprising:
a first structure comprising a first electrode and a piezoresistor; and
a second structure comprising a second electrode;
wherein
the piezoresistor directly contacts the second structure with an infinite resistance between the piezoresistor and the second structure before a pressure is applied against the pressure sensor,
the first electrode is a top electrode;
the piezoresistor is configured on a bottom side of the top electrode;

the second electrode is a bottom electrode configured under the piezoresistor; and the piezoresistor directly contacts the bottom electrode with an infinite resistance between the piezoresistor and the bottom electrode before a pressure is applied against the pressure sensor.

11. The instant response pressure sensor as claimed in claim 10, wherein a bottom surface of the piezoresistor is a rugged surface in a microscopic view, and the bottom surface of the piezoresistor has partial areas in direct contact with a top surface of the bottom electrode to maintain the infinite resistance between the piezoresistor and the bottom electrode before a pressure is applied against the pressure sensor.

12. An instant response pressure sensor, comprising:

a first structure comprising a first electrode and a piezoresistor; and a second structure comprising a second electrode; wherein the piezoresistor directly contacts the second structure with an infinite resistance between the piezoresistor and the second structure before a pressure is applied against the pressure sensor, the first electrode is in direct contact with the piezoresistor at all times, the second electrode is in direct contact with the piezoresistor at all times, and the first electrode and the second electrode are serially electrically connected with each other by the piezoresistor.

13. The instant response pressure sensor as claimed in claim 12, wherein the piezoresistor has a rugged surface in a microscopic view, and before a pressure is applied against the pressure sensor, the surface of the piezoresistor has partial areas in direct contact with a surface of the second electrode to maintain an infinite resistance between the piezoresistor and the second electrode.

14. The instant response pressure sensor as claimed in claim 13, wherein, in said microscopic view, the surface of the piezoresistor has a higher roughness than the surface of the second electrode.

* * * * *